United States Patent [19]
Berger et al.

[11] Patent Number: 5,484,573
[45] Date of Patent: Jan. 16, 1996

[54] REACTOR FOR CARRYING OUT CHEMICAL REACTIONS

[75] Inventors: Harald Berger, Kelkheim; Norbert Dragesser, Weinbach; Rudolf Heumueller, Rodgau; Erich Schaetzer, Bensheim; Manfred Wagner, Hofheim, all of Germany

[73] Assignee: Hoechst Aktiengesellschaft, Germany

[21] Appl. No.: 112,686

[22] Filed: Aug. 26, 1993

[30] Foreign Application Priority Data

Aug. 28, 1992 [DE] Germany .................... 42 28 618.2

[51] Int. Cl.⁶ ................ B06B 1/00; C08F 2/00; B01F 11/00
[52] U.S. Cl. ................ 422/128; 422/135; 422/224; 366/108; 366/113; 366/116
[58] Field of Search .................... 422/128, 129, 422/135, 224; 366/108, 113, 116

[56] References Cited

U.S. PATENT DOCUMENTS

| | | | |
|---|---|---|---|
| 2,500,008 | 3/1950 | Richardson | 422/128 |
| 3,350,843 | 11/1967 | Lloyd | 422/128 |
| 3,510,266 | 5/1970 | Miler, Jr. | 422/128 |
| 3,825,481 | 7/1974 | Supitilov | 422/128 |
| 4,168,295 | 9/1979 | Sawyer | 422/111 |
| 4,667,730 | 5/1987 | Zemp | 165/14 |

FOREIGN PATENT DOCUMENTS 2242092 10/1991 United Kingdom.

OTHER PUBLICATIONS

S. V. Ley, C. M. R. Low "Ultrasound in Synthesis" 1989 Springer Verlag, Berlin, Heidelberg, New York, London, Paris, Tokyo, Hong Kong, Seiten 18–28.

Primary Examiner—Robert J. Warden
Assistant Examiner—Christopher Y. Kim
Attorney, Agent, or Firm—Curtis, Morris & Safford

[57] ABSTRACT

In the reactor for carrying out chemical reactions with ultrasound, at least three ultrasonic transducers (15) are arranged on the bottom (13) of the reactor (10) and at least six ultrasonic transducers (15) are arranged on the wall (14).

7 Claims, 1 Drawing Sheet

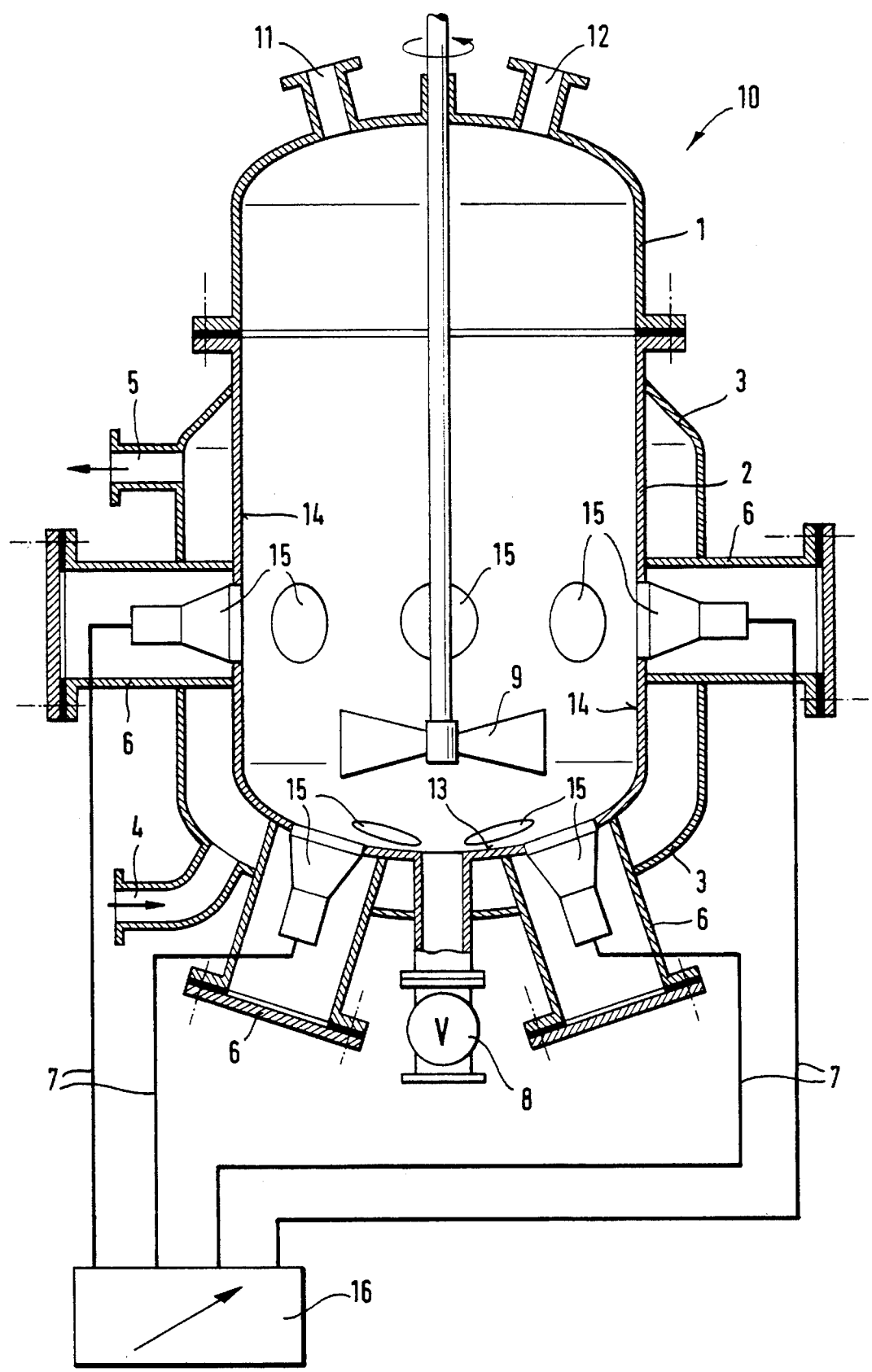

REACTOR FOR CARRYING OUT CHEMICAL REACTIONS

The invention relates to a reactor for carrying out chemical reactions under the action of ultrasound.

Reactors of the abovementioned type have been disclosed by Steven V. Ley and Caroline M. R. Low, Ultrasound in Synthesis, Springer-Verlag 1989, pp. 18 to 28. According to them, the reactor comprises a vessel fitted with ultrasonic transducers, which is filled with a liquid medium (for example water) into which a reaction vessel containing the reaction mixture is immersed. This reactor has the disadvantage that the acoustic output of the liquid medium is not adjustable and both the intensity and the frequency of the ultrasound change with increasing use of the liquid medium. The ultrasound is furthermore attenuated so much by passage through the medium that the acoustic intensity in the reaction vessel is usually only slightly above the lower limit of effectiveness. Another critical feature is that the reproducibility of the reaction results is strongly dependent on the position of the reaction vessel in the bath and on the level to which the reaction vessel is filled with the reaction mixture.

In another embodiment, a horn-shaped ultrasonic transducer is arranged in the reaction vessel and is immersed into the reaction mixture. A disadvantage here is that the sonication is concentrated only in the immediate vicinity of the rod-shaped end of the ultrasonic transducer and most of the reaction volume remains unsonicated.

In a further embodiment the reaction vessel is provided with a nozzle into which the ultrasonic transducer projects in the form of a vibrating plate. The reaction mixture is pumped through the nozzle onto the vibrating plate. This type of reactor is suitable only for reactions between liquid phases. Reactions between liquid and solid phases are not possible.

The invention is intended to provide a solution to this. The object is achieved by a reactor wherein at least three ultrasonic transducers are arranged on the bottom of the reactor and at least six ultrasonic transducers are arranged on the reactor wall.

The ultrasonic transducers may be integrated into the bottom and into the wall and be provided with a cap. The bottom and the wall of the reactor may be double-walled. In an alternative embodiment at least five ultrasonic transducers may be arranged on the bottom of the reactor and at least eight ultrasonic transducers may be arranged on the reactor wall.

The advantages of the reactor according to the invention are essentially that chemical reactions can be reliably initiated and carried out with the aid of ultrasound, both between heterogeneous phases and in a homogeneous phase, batchwise or continuously, at various temperatures. Furthermore, the effect of the ultrasound can be varied by adjustment of the acoustic output.

The invention is further illustrated below with reference to a drawing of just one possible embodiment. FIG. 1 shows a reactor for enhancing chemical reactions.

The FIGURE shows a reactor in the form of a stirred vessel 10 with upper part 1 and lower part 2. The upper part 1 of the vessel 10 is provided with filling ports 11 and 12. The lower part 2, preferably made of chemically resistant material, is fitted on its bottom 13 and its wall 14 with electromechanical transducers (ultrasonic transducers) 15 for transmission of ultrasound. The ultrasonic transducers 15 may be adhesively bonded to the bottom and to the wall or else integrated into the bottom and the wall, i.e. welded in. The maximum achievable acoustic output of the reactor is dependent on the number of ultrasonic transducers provided. The ultrasonic transducers 15 on the bottom of the reactor 13 and those on the reactor wall 14 can if desired be driven independently of one another via cables 7 by an adjustable ultrasonic generator 16, as a result of which the acoustic power can be varied. The ultrasonic transducers 15 can be screened from atmospheric effects by caps 6, with the caps being flushed by a protective gas. The lower part of the reactor 13 may furthermore have a bottom outlet valve 8 and be provided with a double jacket 3 through which the cooling or heating medium may be pumped. Cooling or heating can thus also be ensured between the individual ultrasonic transducers 15. The reactor may furthermore be provided with an agitator 9.

The reactor described allows inorganic and organic synthetic reactions to be carried out with ultrasound on an industrial scale reliably and without difficulty. Reactions are possible both in a homogeneous liquid phase and between heterogeneous phases (liquid/solid and liquid/liquid). The ultrasonic transducers can be operated independently of one another, either individually or as a group on the vessel bottom 13 and on the vessel wall 14. The latter offers the advantage that small quantities of reaction material can initially be economically and effectively sonicated by the bottom groups, and then for a larger volume of contents the wall groups can be switched in to increase the output. By enclosing the ultrasonic transducers fitted to the reactor with caps 6 and if necessary flushing the caps 6 with a protective gas, operation of the reactor is possible also in explosion-risk areas.

The reaction material may be heated or cooled as required during the sonication via the double jacket 3 fitted to the lower part of the vessel 2 with inlet 4 and outlet 5. Reactions under reflux conditions or with simultaneous distilling off of one component are likewise possible. Supply of, for example, reaction components or protective gas is possible via the connections of the upper part of the vessel 1. As many ultrasonic transducers 15 as desired may be fitted to the bottom 13 and the wall 14 of the reactor 10, according to need and the size of the reactor. Five ultrasonic transducers 15 on the bottom 13 and eight ultrasonic transducers 15 on the wall 14 have proved sufficient for a nominal reactor volume of about 50 l.

What is claimed is:

1. A reactor for a chemical reaction, said reactor comprising: a vessel having a bottom and side walls, and an interior defined by said walls for containing the chemical reaction; at least one ultrasonic transducer facing into the interior of the vessel; and means for driving each ultrasonic transducer operably connected to each transducer; wherein each ultrasonic transducer is integral with at least one wall of the vessel; and, cap is positioned over each ultrasonic transducer.

2. The reactor as claimed in claim 1, wherein at least three ultrasonic transducers are integral with the bottom wall and at least six ultrasonic transducers are integral with the side walls.

3. The reactor as claimed in claim 1, wherein the bottom wall and side walls have an exterior surface and the reactor further comprising an external jacket surrounding the bottom wall and the side walls, means defining a passageway between the jacket and the exterior surface of the bottom wall and side walls, inlet means for transmitting a cooling or heating medium into the passageway, and, outlet means for transmitting said medium out of the passageway.

4. The reactor as claimed in claim 1, wherein at least five ultrasonic transducers are integral with the bottom wall and at least eight ultrasonic transducers are integral with the side walls.

5. The reactor as claimed in claim 1 wherein the means for driving each ultrasonic transducer is an ultrasonic generator.

6. The reactor as claimed in claim 5 wherein each ultrasonic transducer is operably connected to the ultrasonic generator via cables.

7. The reactor as claimed in claim 1 wherein the means for driving each ultrasonic tranducer includes means for independently driving each ultrasonic transducer.

* * * * *